(12) United States Patent
Wu et al.

(10) Patent No.: US 9,122,346 B2
(45) Date of Patent: Sep. 1, 2015

(54) METHODS FOR INPUT-OUTPUT CALIBRATION AND IMAGE RENDERING

(75) Inventors: Chi-Ling Wu, Taipei (TW); Yu-Pao Tsai, Kaohsiung (TW); Chia-Ping Chen, Nantou County (TW); Yu-Ting Chen, Taipei (TW)

(73) Assignee: MEDIATEK INC., Science-Based Industrial Park, Hsin-Chu (TW)

( * ) Notice: Subject to any disclaimer, the term of this patent is extended or adjusted under 35 U.S.C. 154(b) by 277 days.

(21) Appl. No.: 13/426,604

(22) Filed: Mar. 22, 2012

(65) Prior Publication Data

US 2013/0249864 A1   Sep. 26, 2013

(51) Int. Cl.
*G06F 3/042* (2006.01)
*G06F 3/041* (2006.01)

(52) U.S. Cl.
CPC ............. *G06F 3/0418* (2013.01); *G06F 3/042* (2013.01)

(58) Field of Classification Search
CPC ....................................................... G06F 3/042
USPC ......................................... 345/173, 175, 176
See application file for complete search history.

(56) References Cited

U.S. PATENT DOCUMENTS

| | | | |
|---|---|---|---|
| 4,836,670 A * | 6/1989 | Hutchinson | 351/210 |
| 7,306,337 B2 * | 12/2007 | Ji et al. | 351/209 |
| 2010/0103375 A1 * | 4/2010 | Chao | 351/210 |
| 2012/0044213 A1 * | 2/2012 | Lu et al. | 345/175 |
| 2013/0083976 A1 * | 4/2013 | Ragland | 382/117 |
| 2013/0234990 A1 * | 9/2013 | Wang et al. | 345/175 |
| 2013/0241890 A1 * | 9/2013 | Sharma | 345/175 |

* cited by examiner

*Primary Examiner* — Pegeman Karimi
(74) *Attorney, Agent, or Firm* — Winston Hsu; Scott Margo (57) ABSTRACT

One of the embodiments of the invention provides an input-output calibration method performed by a processing unit connected to an output device and an input device. The output device and the input device correspond to an output device coordinate system and an input device coordinate system, respectively. The processing unit first derives M calibration points' coordinates in the input device coordinate system by using the input device to sense a viewer specifying the M calibration points' positions, wherein M is a positive integer. Then, the processing unit uses the M calibration points' coordinates in the output device coordinate system and coordinates in the input device coordinate system to derive the relationship between the output device coordinate system and the input device coordinate system.

16 Claims, 5 Drawing Sheets

METHODS FOR INPUT-OUTPUT CALIBRATION AND IMAGE RENDERING

BACKGROUND

1. Technical Field

The invention relates generally to input-output calibration, and more particularly, to methods for input-output calibration and image rendering.

2. Related Art

With an input device and an output device, a processing unit should be able to facilitate vision-based interaction between a user and visual content displayed for the user. For example, the input device can be a camera that captures images of the user for the processing unit; the output device can be a display device that display the visual content rendered by the processing unit. The output device can display the visual content on a screen.

If the spatial relationship between the camera and the screen is not fixed, the processing unit must first determine the position of the screen with respect to the camera. A process devised for this purpose can be referred to as an input-output calibration process or a screen-camera calibration process. The process is relatively easy if the camera can see the screen directly. It is more difficult but should be achievable if the camera can see the screen indirectly through a reflective surface.

The camera sometimes is placed adjacent to the screen and facing the user in order to sense all the possible postures, gestures, or lines of sight, of the user by capturing image(s) of the user. However, in such a position, the camera may not see the screen directly or indirectly. Under the circumstances, an unconventional process is needed to facilitate input-output calibration.

SUMMARY

The embodiments of the invention provide an input-output calibration method performed by a processing unit connected to an output device and an input device. The output device and the input device correspond to an output device coordinate system and an input device coordinate system, respectively. The processing unit first derives M calibration points' coordinates in the input device coordinate system by using the input device to sense a viewer specifying the M calibration points' positions, wherein M is a positive integer. Then, the processing unit uses the M calibration points' coordinates in the output device coordinate system and coordinates in the input device coordinate system to derive the relationship between the output device coordinate system and the input device coordinate system.

The embodiments of the invention provide another method performed by a processing unit connected to an output device and an input device. The output device and the input device correspond to an output device coordinate system and an input device coordinate system, respectively. The processing unit first determines the relationship between the output device coordinate system and the input device coordinate system. Then, the processing unit derives spatial information of an object with respect to the input device coordinate system by using the input device to sense the object. Next, the processing unit derives spatial information of the object with respect to the output device coordinate system based on the spatial information of the object with respect to the input device coordinate system and the relationship between the output device coordinate system and the input device coordinate system.

Other features of the present invention will be apparent from the accompanying drawings and from the detailed description which follows.

BRIEF DESCRIPTION OF THE DRAWINGS

The invention is fully illustrated by the subsequent detailed description and the accompanying drawings.

DETAILED DESCRIPTION

Figure 1:
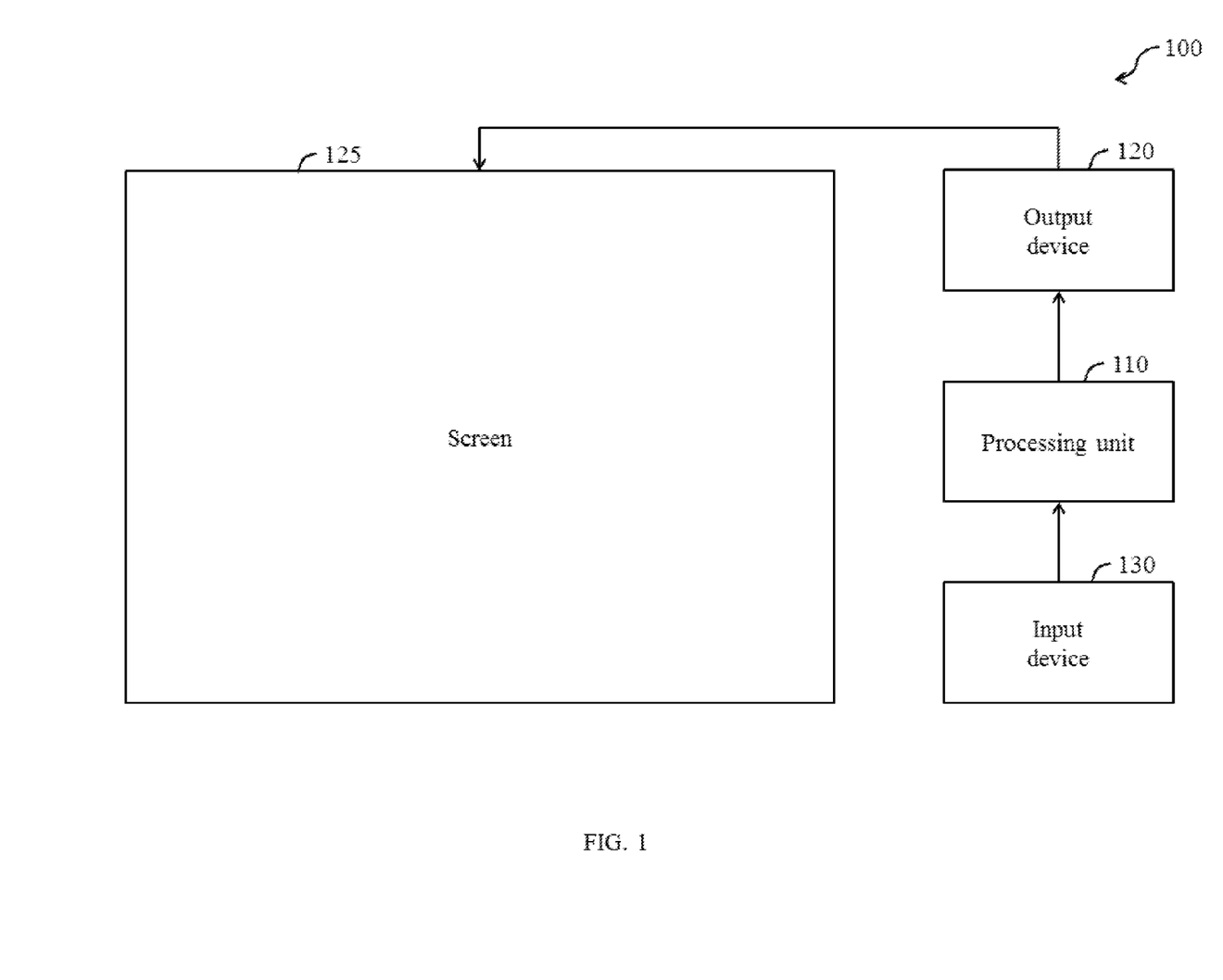
FIG. 1 shows a schematic diagram of a system according to an embodiment of the invention.

FIG. 1 shows a schematic diagram of a system 100 according to an embodiment of the invention. For example, the system 100 can be a visual interactive system 100. In this embodiment, the system 100 includes a processing unit 110, an output device 120, and an input device 130. The processing unit 110 is connected to the output device 120 through a wired or wireless connection, and to the input device 130 through another wired or wireless connection. It is an electronic component/device that can process images captured by the input device 130, and/or render images for the output device 120 to display.

For example, the processing unit 110 can be realized by a central processing unit (CPU), a graphics processing unit (GPU), a visual processing unit (VPU), a desktop computer, a laptop computer, a tablet computer, a video game console, a set-top box, an optical disc player, a smart phone, or any other electronic device/component that has the aforementioned functions. The input device 130 can be a camera that captures two-dimensional images, a stereo camera that captures stereo images to represent three-dimensional scenes, or a depth camera that captures images in which visual depths of objects can be determined. The output device 120 can display the images on a screen 125; the displayed images can be two-dimensional (i.e. 2D) or three-dimensional (i.e. 3D) images rendered by the processing unit 110. The screen 125 can be an integral part or an external part of the output device 120. For example, the output device 120 and the screen 125 can constitute a television, a computer monitor, or a screen of a handheld electronic device. As another example, the output device 120 and the screen 125 can be a projector and a projection screen, respectively.

The processing unit 110 can facilitate vision-based interaction between a user in front of the screen 125 and the visual content displayed on the screen 125. Specifically, the processing unit 110 can use the input device 130 to capture images of the user and render images for the output device 120 based on the captured images of the user. As a result, how the user appears in the captured images may affect how a visual object appears in the rendered images. By doing so, the processing unit 110 can make the user feel like as if he/she is interacting with the visual object(s) displayed on the screen 125.

Before allowing the user to have vision-based interaction with the visual content displayed on the screen 125, the processing unit 110 can first perform an input-output calibration process in order to determine the relationship between an output device coordinate system of the output device 120 and an input device coordinate system of the input device 130. This is because the relationship between the two coordinate systems may be unknown to the processing unit 110.

Hereinafter, the output device coordinate system and the input device coordinate system are referred to as "$O^d$" and "$O^c$," respectively. The output device 120 displays each pixel on the screen 125 based on that pixel's coordinates in $O^d$. For each point sensed by the input device 130, the processing unit 110 may figure out that point's coordinates in $O^c$. But because the input device 130 may be at a position that cannot sense the screen 125, the processing unit 110 may not know where in $O^c$ the screen 125 is located. As a result, the processing unit 110 needs to derive the relationship between $O^d$ and $O^c$. For example, the processing unit 110 can use a coordinate transformation matrix $T^{dc}$ from $O^d$ to $O^c$ to represent the relationship. With the coordinate transformation matrix $T^{dc}$, the processing unit 110 knows where in $O^c$ the screen 125 is located.

Specifically, if a point's position is $P^c$ in $O^c$ and $P^d$ in $O^d$, then $P^c = T^{dc} \times P^d$. Wherein, $$T^{dc} = \begin{bmatrix} r_{11} & r_{12} & r_{13} & t_x \\ r_{21} & r_{22} & r_{23} & t_y \\ r_{31} & r_{32} & r_{33} & t_z \\ 0 & 0 & 0 & 1 \end{bmatrix},$$

$$P^c = \begin{bmatrix} P^c_x \\ P^c_y \\ P^c_z \\ 1 \end{bmatrix},$$

and $$P^d = \begin{bmatrix} P^d_x \\ P^d_y \\ P^d_z \\ 1 \end{bmatrix}.$$

Because it can be assumed that the screen 125 is on the z=0 plane of $O^d$, $P^d_z=0$ for those 2D points displayed on the screen 125. As a result, $r_{13}$, $r_{23}$, and $r_{33}$ are irrelevant in the coordinate transformation matrix $T^{dc}$. After excluding $r_{13}$, $r_{23}$, and $r_{33}$, there are 9 unknowns remaining in the coordinate transformation matrix $T^{dc}$, including $r_{11}$, $r_{21}$, $r_{31}$, $r_{12}$, $r_{22}$, $r_{32}$, $t_x$, $t_y$, and $t_z$.

Figure 2:
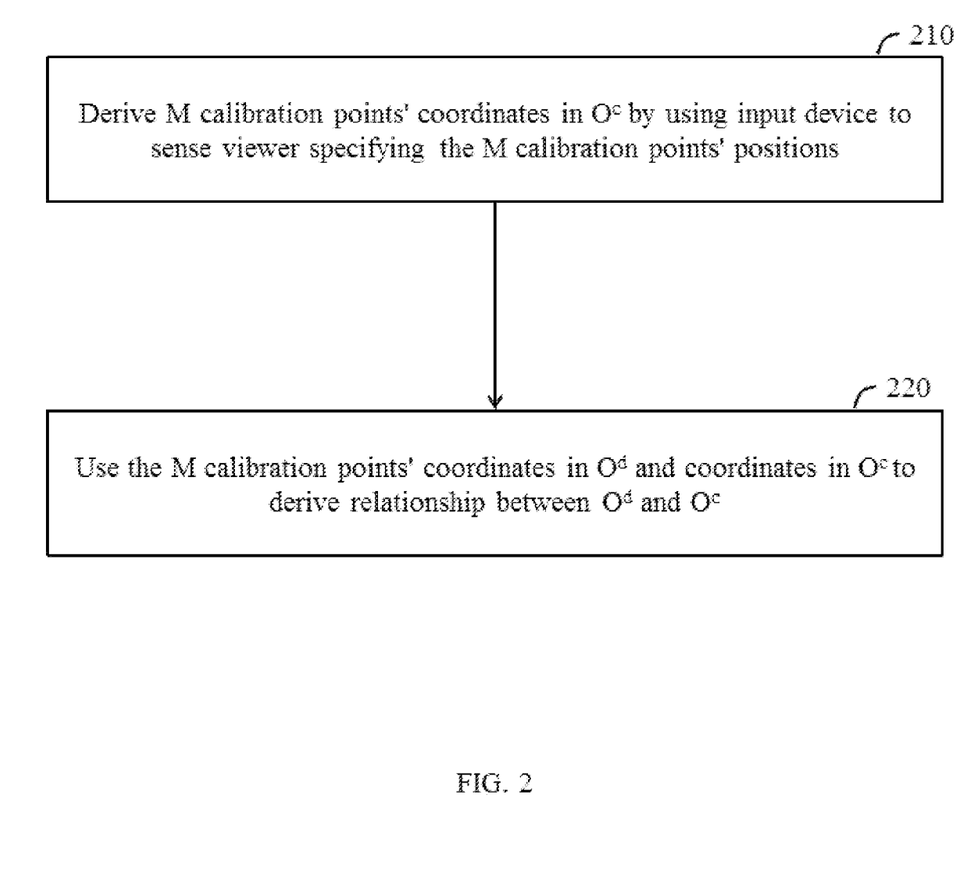
FIG. 2 shows a simplified flowchart of an input-output calibration process performed by the processing unit of FIG. 1.

FIG. 2 shows a simplified flowchart of an input-output calibration process performed by the processing unit 110. At step 210, the processing unit 110 derives M calibration points' coordinates in $O^c$ by using the input device 130 to sense a viewer of the screen 125 specifying the M calibration points' positions on the screen 125, wherein M is a positive integer equal to or larger than three. Although in the following paragraphs it's assumed that the viewer is a real person, the viewer can also be a machine such as a robot. As some examples, the viewer can specify the calibration points' positions on the screen 125 by pointing at the calibration points using a relatively straight thing such as a finger, a stick, a baton, or a pen, or by gazing at the points.

In this embodiment, the M calibration points are those that the processing unit 110 knows or can ascertain their coordinates in $O^d$. For example, any one of the M calibration points can be a corner point of the images displayed on the screen 125. As another example, any one of the M calibration points can be a point displayed within the images. The calibration points can constitute some points in a calibration pattern, such as a triangle, displayed on the screen 125, and the processing unit 110 can control the output device 120 to highlight the M calibration points in the calibration pattern.

For the sake of simplicity, in the following explanation it is assumed that M is equal to three and the M calibration points include calibration points $P_1$, $P_2$, and $P_3$ displayed on the screen 125. Furthermore, because it is assumed that the screen 125 is on the z=0 plane of $O^d$, the z coordinates of these calibration points in $O^d$ are zeros.

At step 210, the processing unit 110 can derive two lines in $O^c$ for each of the calibration points $P_1$, $P_2$, and $P_3$ by using the input device 130 to sense the viewer specifying the calibration point's position on the screen 125 from two different positions. For example, the processing unit 110 can use the input device 130 to capture an image of the viewer pointing at calibration point $P_1$ using a finger from a first position. The processing unit 110 can then use the fingertip's position in the image as a reference point $F_{11}$ in $O^c$ and the finger's direction in the image as a vector $\vec{D}_{11}$ in $O^c$. As another example, the processing unit 110 can use the input device 130 to capture an image of the viewer gazing at calibration point $P_1$ from the first position. The processing unit 110 can then the position of one of the viewer's eyes in the image as the reference point $F_{11}$ in $O^c$ and the line of sight of the eye in the image as the vector $\vec{D}_{11}$ in $O^c$. The calibration point $P_1$'s coordinates $P^c_1$ in $O^c$ should be equal to $F_{11}+(\vec{D}_{11} \times t_{11})$, wherein $P^c_1$ and $t_{11}$ are still unknown. If the unknowns $P^c_1$ and $t_{11}$ are replaced by variables P and t, the processing unit 110 can get an equation $P=F_{11}+(\vec{D}_{11} \times t)$ that defines a line $L_{11}$ in $O^c$. The calibration point $P_1$'s coordinates $P^c_1$ in $O^c$ should be equal to $F_{11}+(\vec{D}_{11} \times t_{11})$, wherein $P^c_1$ and $t_{11}$ are still unknown. If the unknowns $P^c_1$ and $t_{11}$ are replaced by variables P and t, the processing unit 110 can get an equation $P=F_{11}+(\vec{D}_{11} \times t)$ that defines a line $L_{11}$ in $O^c$.

Similarly, the processing unit 110 can use the input device 130 to capture another image of the viewer pointing/gazing at calibration point $P_1$ from a second position. Using the image, the processing unit 110 can derive a reference point $F_{12}$ in $O^c$ and a vector $\vec{D}_{12}$ in $O^c$. The calibration point $P_1$'s coordinates $P^c_1$ in $O^c$ should be equal to $F_{12}+(\vec{D}_{12} \times t_{12})$, wherein $P^c_1$ and $t_{12}$ are still unknown. If the unknowns $P^c_1$ and $t_{12}$ are replaced by variables P and t, the processing unit 110 can get an equation $P=F_{12}+\vec{D}_{12} \times t)$ that defines a line $L_{12}$ in $O^c$.

Then, the processing unit 110 can use lines $L_{11}$ and $L_{12}$ to derive calibration point $P_1$'s coordinates $P^c_1$ in $O^c$. Please note that the derived coordinates can represent either an actual intersection point of lines $L_{11}$ and $L_{12}$, or a point that is close (or closest) to both lines $L_{11}$ and $L_{12}$ if the two lines misses each other and do not intersect.

Figure 3:
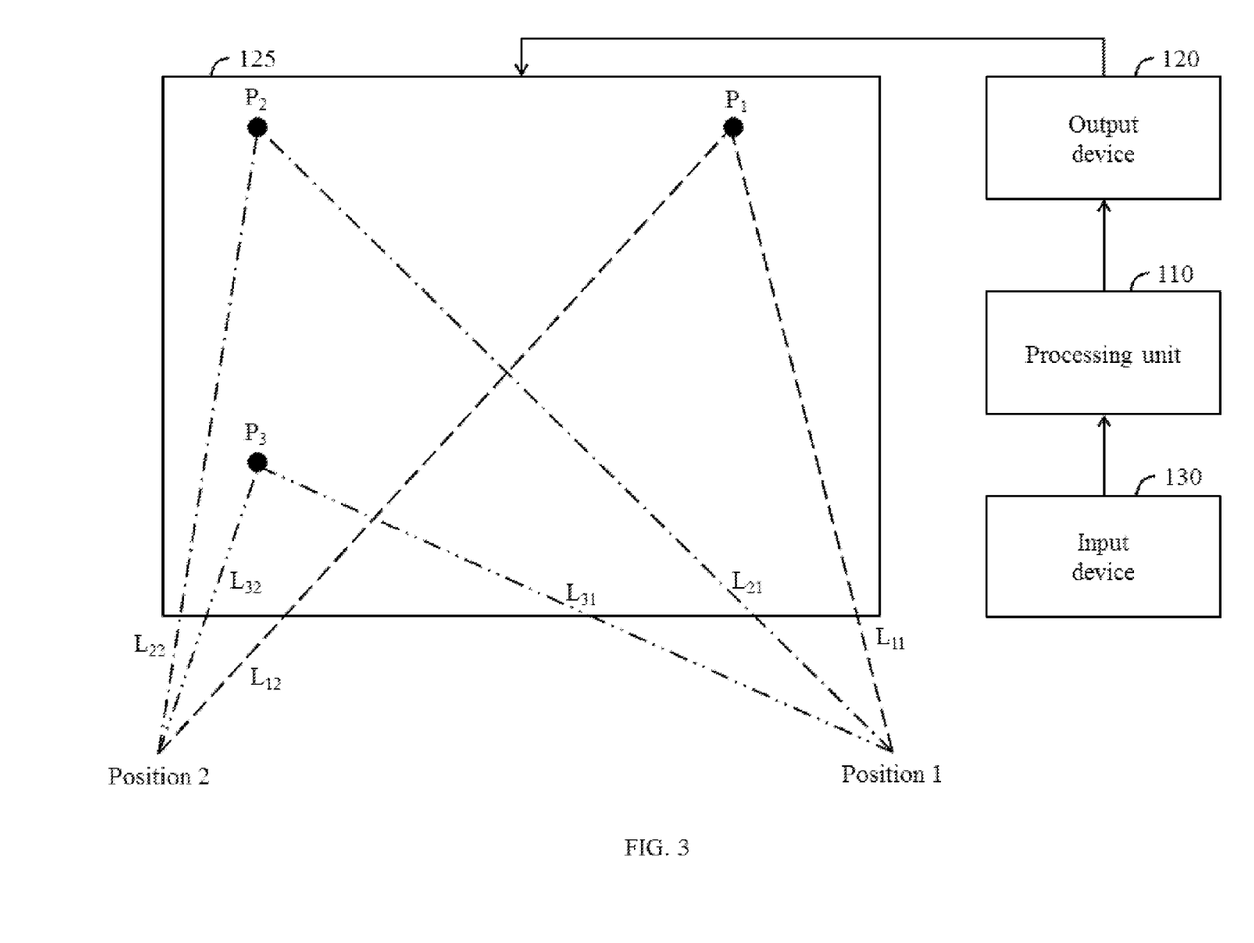
FIG. 3 shows a schematic diagram illustrating how the processing unit of FIG. 1 can derive three calibration points' coordinates.

Using the similar approach, the processing unit 110 can derive the coordinates of calibration points $P_2$ and $P_3$ in $O^c$. As mentioned above, the processing unit 110 can sense the viewer pointing/gazing at each of the calibration points $P_1$, $P_2$, and $P_3$ from two different positions. Since there are three calibration points, the viewer may need to move to up to six different positions. To make it easier for the viewer, the processing unit 110 can let the viewer point/gaze at calibration points $P_1$, $P_2$, and $P_3$ one by one when the viewer is at a first position, and then derive lines $L_{11}$, $L_{21}$, and $L_{31}$ for calibration points $P_1$, $P_2$, and $P_3$, respectively. Next, the processing unit 110 can let the viewer point/gaze at calibration points $P_1$, $P_2$, and $P_3$ one by one when the viewer is at a second position, and then derive lines $L_{12}$, $L_{22}$, and $L_{32}$ for calibration points $P_1$, $P_2$, and $P_3$, respectively. As a result, the viewer only has to be at two different positions to assist with step 210. FIG. 3 shows a schematic diagram illustrating the spatial relationship between the calibration points and the lines for deriving the coordinates of the calibration points.

As mentioned above, the processing unit 110 knows or can ascertain the coordinates $P^d_1$, $P^d_2$, and $P^d_3$ of the calibration points $P_1$, $P_2$, and $P_3$ in $O^d$. Furthermore, by performing step 210, the processing unit 110 can derive the coordinates $P^c_1$, $P^c_2$, and $P^c_3$ of the calibration points $P_1$, $P_2$, and $P_3$ in $O^c$. Then, at step 220, the processing unit 110 uses the coordinates $P^d_1$, $P^d_2$, and $P^d_3$ in $O^d$ and the coordinates $P^c_1$, $P^c_2$, and $P^c_3$ in $O^c$ to derive the relationship between $O^d$ and $O^c$. In this embodiment, the processing unit 110 derives the coordinate transformation matrix $T^{dc}$ and uses coordinate transformation matrix $T^{dc}$ to represent the relationship between $O^d$ and $O^c$. Specifically, by substituting the coordinates $P^d_1$, $P^d_2$, and $P^d_3$ and the coordinates $P^c_1$, $P^c_2$, and $P^c_3$ into the matrix equation of $P^c = T^{dc} \times P^d$, the processing unit 110 can derive the values of the 9 unknowns $r_{11}$, $r_{21}$, $r_{31}$, $r_{12}$, $r_{22}$, $r_{32}$, $t_x$, $t_y$, and $t_z$ in the coordinate transformation matrix $T^{dc}$.

Hereinafter a specific example is provided. In the example, the calibration points $P_1$ and $P_2$ are displayed on a horizontal line on the screen 125, and the calibration points $P_2$ and $P_3$ are displayed on a vertical line on the screen 125. In addition, the coordinates $P^d_1$, $P^d_2$, and $P^d_3$ and the coordinates $P^c_1$, $P^c_2$, and $P^c_3$ are as follows:

$P^d_1 = (p^d_{x2}, p^d_{y1}, 0)$
$P^d_2 = (p^d_{x1}, p^d_{y1}, 0)$
$P^d_3 = (p^d_{x1}, p^d_{y2}, 0)$
$P^c_1 = (p^c_{1x}, p^c_{1y}, p^c_{1z})$
$P^c_2 = (p^c_{2x}, p^c_{2y}, p^c_{2z})$
$P^c_3 = (p^c_{3x}, p^c_{3y}, p^c_{3z})$

By substituting these coordinates into the matrix equation of $P^c = T^{dc} \times P^d$, the processing unit 110 can get nine algebraic equations:

$p^c_{1x} = (r_{11} \times p^d_{x2}) + (r_{12} \times p^d_{y1}) + t_x$ $p^c_{1y} = (r_{21} \times p^d_{x2}) + (r_{22} \times p^d_{y1}) + t_y$ $p^c_{1z} = (r_{31} \times p^d_{x2}) + (r_{32} \times p^d_{y1}) + t_z$ $p^c_{2x} = (r_{11} \times p^d_{x1}) + (r_{12} \times p^d_{y1}) + t_x$ $p^c_{2y} = (r_{21} \times p^d_{x1}) + (r_{22} \times p^d_{y1}) + t_y$ $p^c_{2z} = (r_{31} \times p^d_{x1}) + (r_{32} \times p^d_{y1}) + t_z$ $p^c_{3x} = (r_{11} \times p^d_{x1}) + (r_{12} \times p^d_{y2}) + t_x$ $p^c_{3y} = (r_{21} \times p^d_{x1}) + (r_{22} \times p^d_{y2}) + t_y$ $p^c_{3z} = (r_{31} \times p^d_{x1}) + (r_{32} \times p^d_{y2}) + t_z$ With these 9 algebraic equations, the processing unit 110 can ascertain the values of the 9 unknowns $r_{11}$, $r_{21}$, $r_{31}$, $r_{12}$, $r_{22}$, $r_{32}$, $t_x$, $t_y$, and $t_z$, as follows:

$r_{11} = (p^c_{1x} - p^c_{2x})/(p^d_{x2} - p^d_{x1})$ $r_{21} = (p^c_{1y} - p^c_{2y})/(p^d_{x2} - p^d_{x1})$ $r_{31} = (p^c_{1z} - p^c_{2z})/(p^d_{x2} - p^d_{x1})$ $r_{12} = (p^c_{3x} - p^c_{2x})/(p^d_{y2} - p^d_{y1})$ $r_{22} = (p^c_{3y} - p^c_{2y})/(p^d_{y2} - p^d_{y1})$ $r_{32} = (p^c_{3z} - p^c_{2z})/(p^d_{y2} - p^d_{y1})$ $t_x = p^c_{3x} - (r_{11} \times p^d_{x1}) - (r_{12} \times p^d_{y2})$ $t_y = p^c_{3y} - (r_{21} \times p^d_{x1}) - (r_{22} \times p^d_{y2})$ $t_z = p^c_{3z} - (r_{31} \times p^d_{x1}) - (r_{32} \times p^d_{y2})$ Once these 9 unknowns of the coordinate transformation matrix $T^{dc}$ are determined, the processing unit 110 has ascertained the relationship between $O^d$ and $O^c$. In other words, the processing unit 110 has completed the input-output calibration process and can then use the relationship to facilitate vision-based interaction between a user and the visual content displayed on the screen 125.

The input-output calibration process explained above can work even when the input device 130 does cannot sense the screen 125 directly or indirectly through a reflective surface. Because the input device 130 needs not be placed at a position where it can see the screen 125, the input device 130 can to be placed at a superior or even optimum position for sensing the user and hence can have fewer blind spots in sensing the user.

Figure 4:
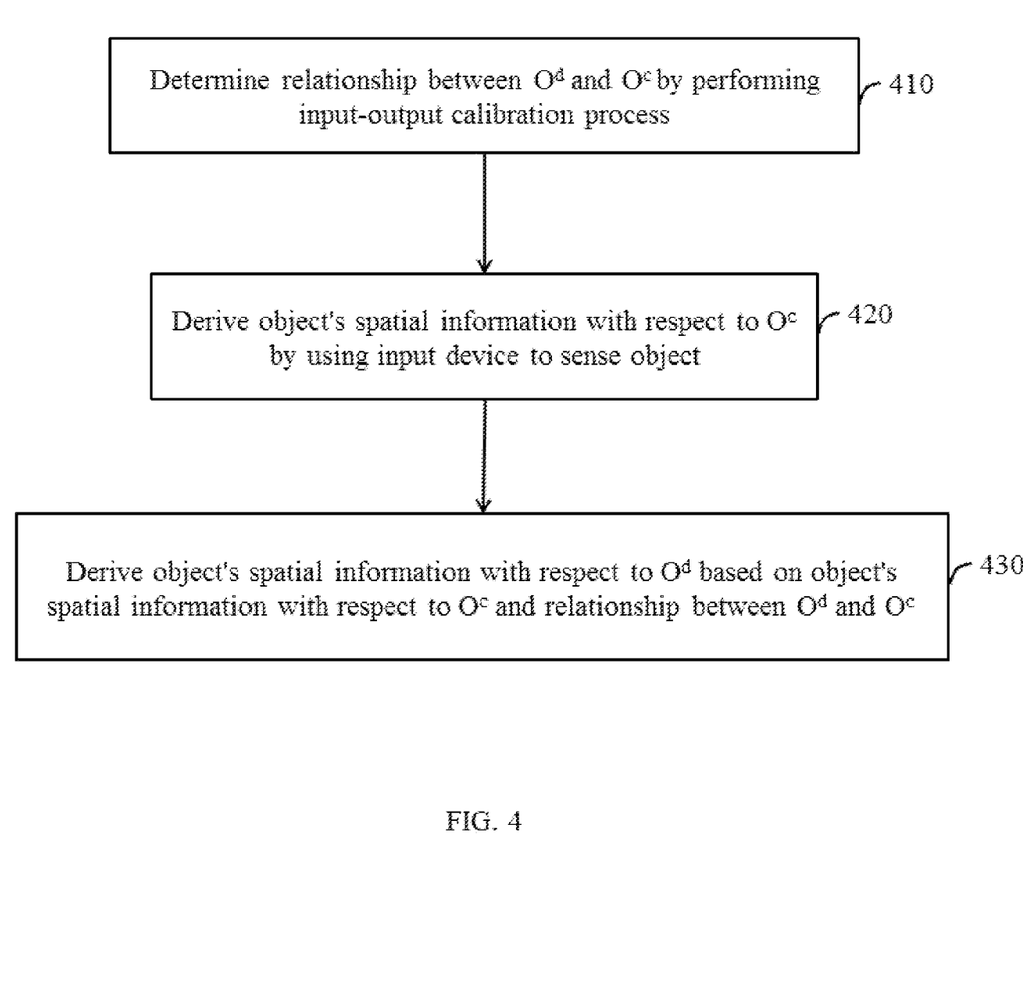
FIG. 4 shows a simplified flowchart of another method performed by the processing unit of FIG. 1.

FIG. 4 shows a simplified flowchart of a method performed by the processing unit 110 of FIG. 1. First, at step 410, the processing unit 110 determines the relationship between $O^d$ and $O^c$ by performing an input-output calibration process. For example, the input-output calibration process can be the one shown in FIG. 2 and explained above, or be any other process that can help the processing unit 110 determine the relationship between $O^d$ and $O^c$. Since the coordinate transformation matrix $T^{dc}$ from $O^d$ to $O^c$ can represent the relationship between $O^d$ and $O^c$, at step 410 the processing unit 110 can try to derive the coordinate transformation matrix $T^{dc}$.

Then, at step 420, the processing unit 110 derives an object's spatial information with respect to $O^c$ by using the input device 130 to sense the object. The input device 130 can do so by capturing image(s) of the object. For example, the object can be a part of a user's body, such as the user's head, eye, hand, finger, or leg. The object's spatial information with respect to $O^c$ may indicate where and in what orientation the object appears in $O^c$. Specifically, by using the input device 130 to capture images of the object, the processing unit 110 can determine some coordinates in $O^c$ that represent the object's location, orientation, or moving path with respect to $O^c$.

Next, at step 430, the processing unit 110 derives the object's spatial information with respect to $O^d$ based on the relationship between $O^d$ and $O^c$ determined at step 410 and the object's spatial information with respect to $O^c$. The object's spatial information with respect to $O^d$ may indicate where and in what orientation the object appears in $O^d$.

The processing unit 110 can perform step 430 by either transforming some coordinates (which may be related to the object sensed at step 420) in $O^c$ into coordinates in $O^d$, or by transforming some coordinates (which may be related to a visual object to be displayed by the output device 120) in $O^d$ into coordinates in $O^c$. In effect, the transformation may allow the processing unit 110 to ascertain the spatial relationship between the sensed object and the visual object to be displayed.

For example, the spatial information of the user's head with respect to $O^d$ may indicate how far the user's head is away from the screen 125, or from what angle or distance the user is viewing the screen 125. As another example, the processing unit 110 can use the spatial information of the user's hand with respect to $O^d$ to recognize the user's gestures, such as a push gesture made toward a visual object displayed on the screen 125. As still another example, the processing unit 110 can use the spatial information of the user's body part with respect to $O^d$ to track the position or orientation of the body part with respect to the screen 125.

Figure 5:
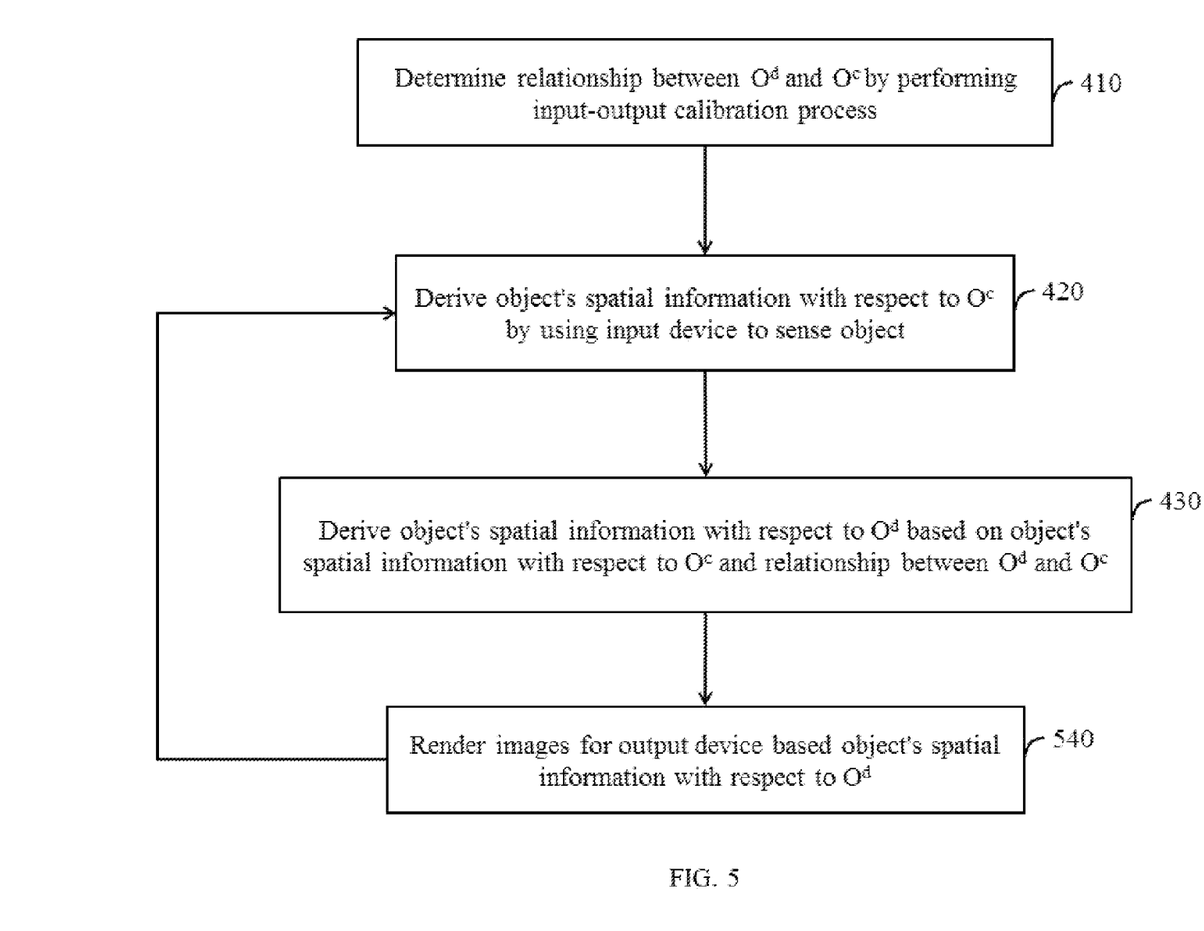
FIG. 5 shows a simplified flowchart of still another method performed by the processing unit of FIG. 1.

FIG. 5 shows a simplified flowchart of another method performed by the processing unit 110 of FIG. 1. This flowchart is different from the one shown in FIG. 4 in that the flowchart of FIG. 5 further includes a step 540. In addition, the processing unit 110 can perform steps 420, 430, and 540 iteratively.

At step 540, the processing unit 110 renders images for the output device 120 based on the spatial information of the object with respect to $O^d$. The output device 120 then displays the rendered images on the screen 125. Because of this step, the spatial relationship between the object and the screen 125 can affect the way the processing unit 110 renders scene files into images for the output device 120. For example, at this step, the processing unit 110 can change the orientation, position, or moving path of a visual object displayed on the screen 125 in response to the change of the spatial relationship between the screen 125 and the object sensed by the input device 130 at step 420.

The process shown in FIG. 5 has broad potential applications. For example, with this process, the processing unit 110 can allow the user to interact with the visual content displayed on the screen 125. Hereinafter a few examples will be provided. As a first example, the processing unit 110 can detect the user's gestures (such as push gestures) at step 430 and then render images based on the detected gestures at step 540. By doing so, the processing unit 110 can make the user feel like as if he/she is manipulating a touch screen remotely even if the user's hand never really reaches the screen 125.

As a second example, the processing unit 110 can track the direction/distance from which the user is viewing the screen 125 at step 430 and then render images accordingly at step 540. By doing so, the processing unit 110 can realized the so called "Head-Coupled Perspective" (HCP) or "Head-Coupled Stereo" for the user.

As a third example, the processing unit 110 can track the user's gestures at step 430 and accordingly change the location/orientation of a 3D objects displayed at step 540. By doing so, the processing unit 110 can make the user feel like as if he/she is manipulating the 3D object directly.

As a fourth example, the processing unit 110 can use steps 420, 430, and 540 to make the user feel like as if he/she is trying to catch/dodge a displayed 3D object (such as a virtual dart), or trying to throw an imagined object (such as an imagined dart) to hit a displayed 3D object (such as a virtual flying disk). This can be a video-game related application.

In the foregoing detailed description, the invention has been described with reference to specific exemplary embodiments thereof. It will be evident that various modifications may be made thereto without departing from the spirit and scope of the invention as set forth in the following claims. The detailed description and drawings are, accordingly, to be regarded in an illustrative sense rather than a restrictive sense.

What is claimed is:

1. An input-output calibration method performed by a processing unit connected to an output device and an input device, wherein the output device and the input device correspond to an output device coordinate system and an input device coordinate system, respectively, the method comprising:
   using the input device to derive a plurality of lines in the input device coordinate system for M calibration points by sensing a viewer specifying the M calibration points' positions, wherein the plurality of lines are between the M calibration points and the viewer's different positions, and M is a positive integer equal to or larger than three;
   deriving the M calibration points' coordinates in the input device coordinate system according to the plurality of lines; and
   using the M calibration points' coordinates in the output device coordinate system and coordinates in the input device coordinate system to derive the relationship between the output device coordinate system and the input device coordinate system.

2. The method of claim 1, wherein for each of the M calibration points, the step of deriving the calibration point's coordinates in the input device coordinate system comprises:
   deriving two lines in the input device coordinate system for the calibration point by using the input device to sense the viewer specifying the calibration point's position from two different positions; and
   using the two lines to derive the calibration point's coordinates in the input device coordinate system.

3. The method of claim 2, wherein the step of deriving the two lines in the input device coordinate system for the calibration point comprises:
   deriving a first reference point and a first vector in the input device coordinate system by using the input device to sense the viewer pointing at the calibration point from one of the two different positions; and
   deriving a second reference point and a second vector in the input device coordinate system by using the input device to sense the viewer pointing at the calibration point from the other of the two different positions;
   wherein the first reference point and the first vector define one of the two lines for the calibration point and the second reference point and the second vector define the other of the two lines for the calibration point.

4. The method of claim 2, wherein the step of deriving the two lines in the input device coordinate system for the calibration point comprises:
   deriving a first reference point and a first vector in the input device coordinate system by using the input device to sense the viewer gazing at the calibration point from one of the two different positions; and
   deriving a second reference point and a second vector in the input device coordinate system by using the input device to sense the viewer gazing at the calibration point from the other of the two different positions;
   wherein the first reference point and the first vector define one of the two lines for the calibration point and the second reference point and the second vector define the other of the two lines for the calibration point.

5. The method of claim 1, wherein the processing unit uses a coordinate transformation matrix to represent the relationship between the output device coordinate system and the input device coordinate system.

6. A method performed by a processing unit connected to an output device and an input device, wherein the output device and the input device correspond to an output device coordinate system and an input device coordinate system, respectively, the method comprising:
   determining the relationship between the output device coordinate system and the input device coordinate system, wherein the step of determining the relationship between the output device coordinate system and the input device coordinate system comprises: using the input device to derive a plurality of lines in the input device coordinate system for M calibration points by sensing a viewer specifying the M calibration points' positions, wherein the plurality of lines are between the M calibration points and the viewer's different positions, and M is a positive integer equal to or larger than three; deriving the M calibration points' coordinates in the input device coordinate system according to the plurality of lines; and using the M calibration points' coordinates in the output device coordinate system and coordinates in the input device coordinate system to derive the relationship between the output device coordinate system and the input device coordinate system;

deriving an object's spatial information with respect to the input device coordinate system by using the input device to sense the object; and deriving the object's spatial information with respect to the output device coordinate system based on the spatial information of the object with respect to the input device coordinate system and the relationship between the output device coordinate system and the input device coordinate system.

7. The method of claim 6, wherein for each of the M calibration points, the step of deriving the calibration point's coordinates in the input device coordinate system comprises:

deriving two lines in the input device coordinate system for the calibration point by using the input device to sense the viewer specifying the calibration point's position from two different positions; and using the two lines to derive the calibration point's coordinates in the input device coordinate system.

8. The method of claim 7, wherein the step of deriving the two lines in the input device coordinate system for the calibration point comprises:

deriving a first reference point and a first vector in the input device coordinate system by using the input device to sense the viewer pointing at the calibration point from one of the two different positions; and deriving a second reference point and a second vector in the input device coordinate system by using the input device to sense the viewer pointing at the calibration point from the other of the two different positions;

wherein the first reference point and the first vector define one of the two lines for the calibration point and the second reference point and the second vector define the other of the two lines for the calibration point.

9. The method of claim 7, wherein the step of deriving the two lines in the input device coordinate system for the calibration point comprises:

deriving a first reference point and a first vector in the input device coordinate system by using the input device to sense the viewer gazing at the calibration point from one of the two different positions; and deriving a second reference point and a second vector in the input device coordinate system by using the input device to sense the viewer gazing at the calibration point from the other of the two different positions;

wherein the first reference point and the first vector define one of the two lines for the calibration point and the second reference point and the second vector define the other of the two lines for the calibration point.

10. The method of claim 6, wherein the processing unit uses a coordinate transformation matrix to represent the relationship between the output device coordinate system and the input device coordinate system.

11. The method of claim 6, wherein the object comprises a user's hand, and the step of detecting the object's spatial information with respect to the output device coordinate system comprises:

detecting the user's gesture with respect to the output device coordinate system based on the spatial information of the object with respect to the input device coordinate system and the relationship between the output device coordinate system and the input device coordinate system.

12. The method of claim 11, wherein the user's gesture comprises a push gesture made by the user toward a screen of the output device.

13. The method of claim 6, wherein the object comprises a user's head, and the step of detecting the object's spatial information with respect to the output device coordinate system comprises:

tracking the angle or distance from which the user is viewing a screen of the output device based on the spatial information of the object with respect to the input device coordinate system and the relationship between the output device coordinate system and the input device coordinate system.

14. The method of claim 6, wherein the step of detecting the object's spatial information with respect to the output device coordinate system comprises:

tracking the object's orientation, location, or movement with respect to the output device coordinate system based on the spatial information of the object with respect to the input device coordinate system and the relationship between the output device coordinate system and the input device coordinate system.

15. The method of claim 6, further comprising:

rendering images for the output device based on the object's spatial information with respect to the output device coordinate system.

16. The method of claim 15, wherein the step of rendering the images for the output device based on the object's spatial information with respect to the output device coordinate system comprises:

determining the orientation, position, or moving path of a visual object in the images based on the object's spatial information with respect to the output device coordinate system.

* * * * *